UNITED STATES PATENT OFFICE.

JOHANNES SCHIFFMANN, OF BALLENSTEDT, GERMANY.

METHOD OF MAKING AN INDESTRUCTIBLE BLACK STAMP DYE FOR DOCUMENTS.

1,421,728.     Specification of Letters Patent.     Patented July 4, 1922.

No Drawing.     Application filed August 8, 1921. Serial No. 490,821.

*To all whom it may concern:*

Be it known that I, Dr. JOHANNES SCHIFFMANN, a citizen of the German Republic, and residing at Ballenstedt, Germany, have invented certain new and useful Improvements in a Method of Making an Indestructible Black Stamp Dye for Documents (for which I have filed an application in Germany May 4, 1920, No. Sch. 58,194 IV 122 G.), of which the following is a specification.

This invention relates to an improved method of making an air-, light- and waterproof, indestructible black stamp-dye for documents, which essentially consists in mixing a pigment that is insoluble in water, namely aniline-black that is soluble in alcohol, with gallotannate of iron, dissolving said mixture while hot in acetine, and adding lamp-black to said mixture.

The employment of acetine for dissolving certain pigments in the manufacture of coloured impressions for textile products is already known. Black is, however, produced by the oxidation of aniline with chlorates and salts of copper or chromates on the fibre. For making dyes for caoutchouc- and metal-stamps, for paper, acetine has not yet been used as a dissolving agent.

The black metal-stamp-dyes hitherto known are oils mixed with lamp-black. The black caoutchouc-stamp-dyes consist of a solution of nigrosine in hydrous glycerine. The former are adapted for metal-stamps only, and the latter for caoutchouc-stamps only. By means of metal-stamps, with the employment of the known oil-dye, hardly a sharp impression can be obtained, while the latter gets easily blotted out owing to the dye drying slowly.

The impressions made by caoutchouc-stamps with the employment of the known glycerine-dye, are never deep-black but mostly of a bluish or grey colour, while they are, besides, neither air-, nor light-, nor waterproof, their removal from documents being comparatively easy. Said drawbacks are detrimental for the reason that caoutchouc-stamps, owing to their handiness, are generally used by public institutions.

For putting the improved method into practice, for instance, about 100 parts of aniline-black, that is soluble in alcohol, are mixed with about 25 parts of gallotannate of iron, said mixture, while hot, being dissolved in about 200 parts of acetine, while small quantities of lamp-black are finally added.

Lac-black is a pigment that is distinguished by its absolute genuineness.

Gallotannate of iron, particularly protoxide of or iron or ferrous oxide, effects a rather intimate combination of pigment and fibre and thus makes the former indestructible.

The dye thus made is adapted for use with caoutchouc- and metal-stamps, it being air-, light- and waterproof. The impressions made with the employment of same are deep-black, dry quickly and can be removed from the paper neither mechanically nor chemically without leaving apparent traces of such falsification. The dye can thus advantageously be used for stamping important documents of any kind.

What I claim, is:

A method of making an indestructible black stamp-dye for documents, consisting in mixing a pigment that is insoluble in water, namely aniline-black that is soluble in alcohol, with gallotannate of iron, dissolving said mixture while hot in acetine, and adding lamp-black to said mixture, substantially as and for the purpose set forth.

In testimony whereof I have hereunto set my hand in the presence of two subscribing witnesses.

Dr. JOHANNES SCHIFFMANN.

Witnesses:
    FRITZ GASSE,
    PAUL SCHEFFLER.